United States Patent
Fornoff et al.

(10) Patent No.: US 7,939,981 B2
(45) Date of Patent: May 10, 2011

(54) ELECTRICAL MOTOR AND METHOD FOR CONNECTION OF AN ELECTRICAL MOTOR TO A CONNECTOR FLANGE

(75) Inventors: Dieter Fornoff, Daejeon (KR); Ingo Drewe, Buehl (DE); Juergen Neuenfeld, Friedrichshafen (DE); Frank Miehle, Immenstaad (DE)

(73) Assignee: Robert Bosch GmbH, Stuttgart (DE)

( * ) Notice: Subject to any disclaimer, the term of this patent is extended or adjusted under 35 U.S.C. 154(b) by 548 days.

(21) Appl. No.: 11/597,040

(22) PCT Filed: Apr. 28, 2005

(86) PCT No.: PCT/EP2005/051938
§ 371 (c)(1),
(2), (4) Date: Oct. 19, 2007

(87) PCT Pub. No.: WO2005/113991
PCT Pub. Date: Dec. 1, 2005

(65) Prior Publication Data
US 2008/0054744 A1 Mar. 6, 2008

(30) Foreign Application Priority Data
May 21, 2004 (DE) .......................... 10 2004 025 486

(51) Int. Cl.
*H02K 5/04* (2006.01)
*H02K 5/15* (2006.01)
*H02K 7/10* (2006.01)
*F16H 57/02* (2006.01)
*F16B 19/08* (2006.01)

(52) U.S. Cl. ............. 310/91; 310/89; 310/90; 74/606 R; 411/501

(58) Field of Classification Search ................ 310/75 R, 310/91; 74/7 B, 606 R; 403/278, 408.1; 411/501, 546
See application file for complete search history.

(56) References Cited

U.S. PATENT DOCUMENTS

| | | | |
|---|---|---|---|
| 2,870,356 A * | 1/1959 | Gibson ................. | 310/216.069 |
| 4,440,033 A * | 4/1984 | Kurihara et al. ................. | 74/7 A |
| 4,510,407 A * | 4/1985 | Tomite ..................... | 310/154.26 |
| 4,990,811 A * | 2/1991 | Nakata et al. ................. | 310/239 |
| 5,061,869 A * | 10/1991 | Stewart, Sr. ................... | 310/89 |
| 5,200,658 A * | 4/1993 | Kohno et al. ................... | 310/89 |
| 6,278,209 B1 * | 8/2001 | Rupp et al. ..................... | 310/91 |
| 2001/0017494 A1 * | 8/2001 | Takagi et al. ................... | 310/51 |

FOREIGN PATENT DOCUMENTS

| | | |
|---|---|---|
| DE | 101 18 935 | 11/2002 |
| DE | 103 41 752 | 4/2005 |
| EP | 0 097 875 | 1/1984 |
| JP | 60-160052 U | 10/1985 |
| JP | 9126215 A | 5/1997 |
| JP | 9159002 A | 6/1997 |

* cited by examiner

*Primary Examiner* — Burton Mullins
(74) *Attorney, Agent, or Firm* — Michael Best & Friedrich LLP

(57) ABSTRACT

The invention relates to an electrical motor (10), comprising a shaft (24), a housing (12) with a housing flange (14) and a bearing plate (16) with a bearing plate flange (18), whereby one end of the shaft (24) projects out of the bearing plate (16). The housing flange (14) and the bearing plate flange (18) are connected by means of at least one hollow rivet (20) such that the electrical motor (10) may be mounted by means of a fixing element, in particular, a screw, through the hollow rivet (10) on a connector flange of a gear stage in a working connection with the projecting end of the shaft (24). In one method for connection or said electrical motor (10) to a connector flange, the electrical motor (10) may be mounted by means of a fixing element, through the hollow rivet (10) on a connector flange of a gear stage in a working connection with the projecting end of the shaft (24).

16 Claims, 4 Drawing Sheets

Figure 1:
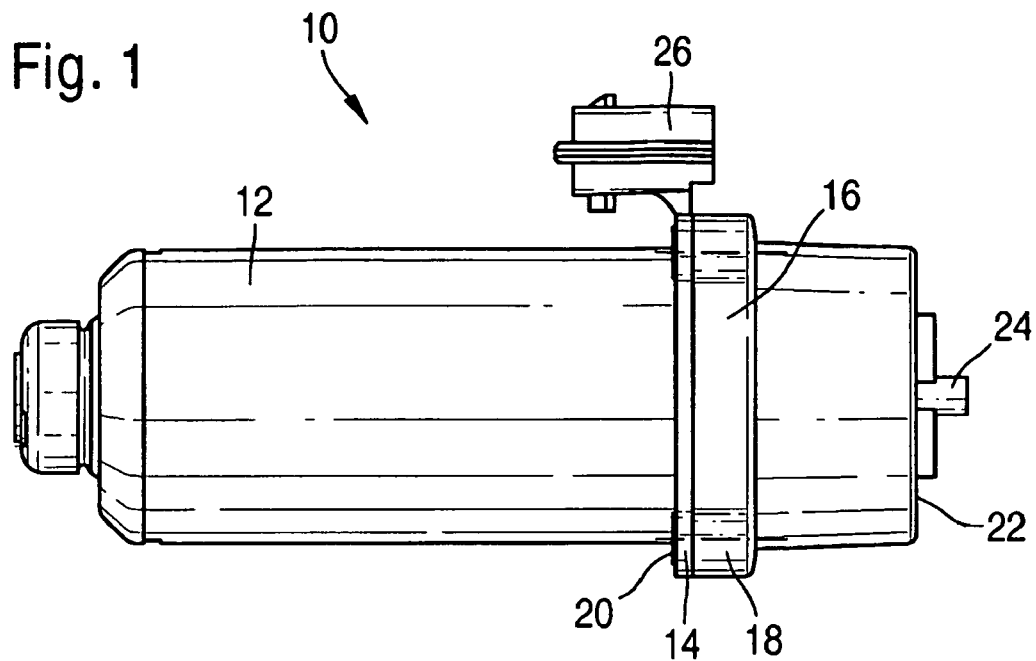

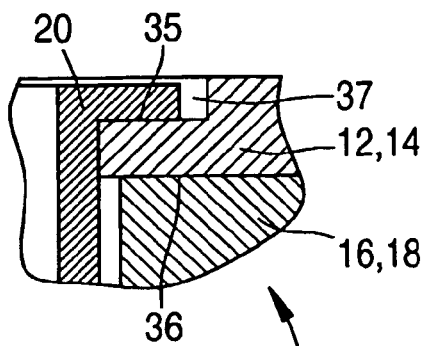
Fig. 6.1
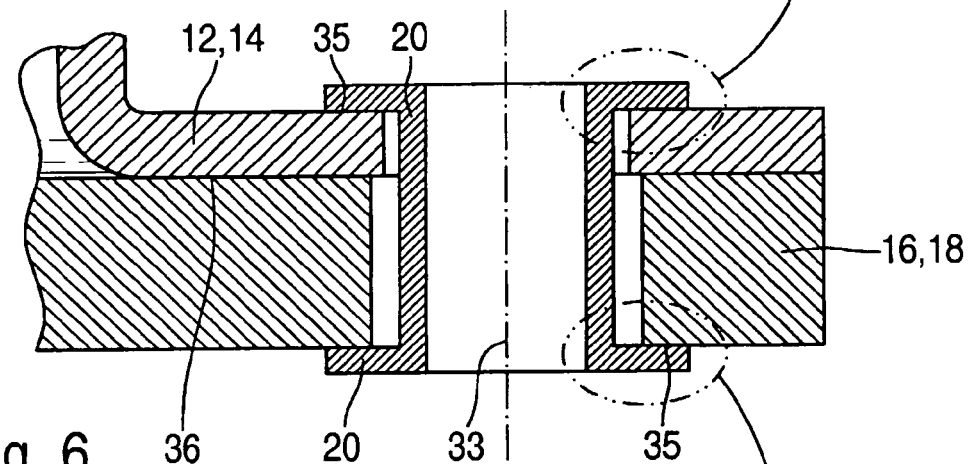
Fig. 6
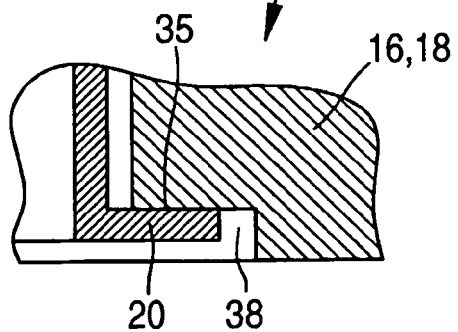
Fig. 6.2

ELECTRICAL MOTOR AND METHOD FOR CONNECTION OF AN ELECTRICAL MOTOR TO A CONNECTOR FLANGE

TECHNICAL FIELD

Due to increasing miniaturization in automobile construction, individual components, particularly electrical machines, are being adapted to structural requirements, particularly to the available installation space. To an increasing degree, electrical machines are adapted directly and without an integrated gear to a connector, wherein any required gear stepping is accomplished on the connector side. The electrical machines are executable components by themselves, which fulfill their electromotive function as an individual unit.

PRIOR ART

Equipping a flange of the electrical machine with separately integrated fastening eyes or screw-down brackets is a common way of fastening the electrical machine to a connector. However, in many areas of application the installation space required for this is not available. In addition, the position of screw-down brackets on the connector can deviate from the position of the integrated eyes or screw-down brackets.

DE 103 41 752.4 deals with a hollow rivet tool with a riveting die as well as riveting method and rivet joint. The described riveting die for deforming a hollow rivet features a rivet shank, which has a penetration segment extending along its axis that is embodied in such that the interior of the center part of a hollow rivet is supported when the riveting die penetrates the hollow rivet during the riveting process. In this manner, deformation of the center part of the hollow rivet is reduced or essentially prevented so that a secure rivet joint is created in a reliable manner. A rivet joint between housing parts of an electrical machine such as a small electrical motor can be created with the disclosed riveting method, or said method can connect a gear housing fabricated of aluminum or plastic to a pole pot manufactured of iron or steel that surrounds the armature shaft of the drive of the electric machine. Permanent magnets that are comprised for example of a ferromagnetic or a rare earth magnet can be embedded in the pole pot.

DESCRIPTION OF THE INVENTION

The electrical machine proposed in accordance with the invention realizes a special assembly concept: The electrical machine may be accommodated, mounted, fixed, fastened or even centered on a connector directly through one or more hollow rivets, with which the housing is mounted to the bearing plate, with a fastening element, particularly with a detachably connectable fastening element such as a screw. The attachment between the electrical machine and connector is thereby designed in an advantageous manner that both optimizes and saves installation space; additional screw-down brackets on a flange of the electrical machine are not required. And because the same fastening eyes are used on the housing flange and on the bearing plate flange, first to connect the housing to the bearing plate and secondly to connect the electrical machine to a connector flange, the installation space required in the area of the flange can be reduced advantageously. In this way, the use possibilities and applications of an electrical machine are expanded advantageously.

The electrical machine in accordance with the invention is by itself a single executable component, which can be mounted during automobile manufacturing depending upon its application. After successful mounting or assembly on the connector flange, the electrical machine meets technical requirements with respect to imperviousness and shaking resistance in an unrestricted manner. The clamping force between the housing flange and the bearing plate flange that is applied via the one or more hollow rivets is increased by the connection by means of the fastening element penetrating one of the hollow rivets, because a solid fastening element such as screw possesses much higher inherent rigidity than the hollow rivet. The hollow rivet can be deformed into the plastic range without the clamping connection being appreciably impacted by the force of the fastening element particularly the screw—the force for the compression of the hollow rivet counteracts the force of the fastening element. The connection via the fastening element supports or increases imperviousness and rigidity so that these technical requirements do not have to be met solely through the hollow rivet connection.

The electrical machine proposed in accordance with the invention can be such a machine that is embodied as a small motor, which can be used in the most varied of applications. In addition, the assembly concept proposed in accordance with the invention can also be used in large or very large electrical machines such as those that are used in the field of power plants.

DRAWINGS

Figure 2:
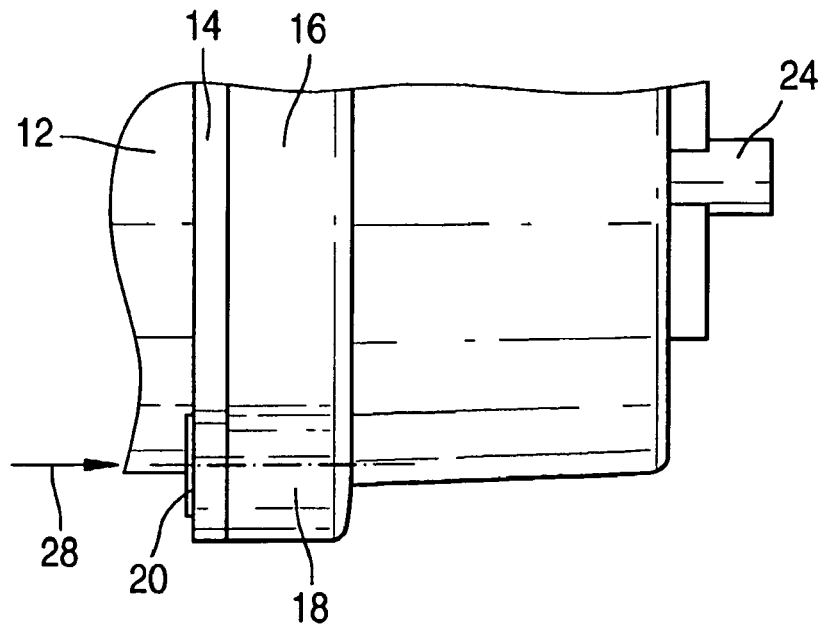

Additional advantages and advantageous embodiments and developments of the invention are depicted in the following figures and their descriptions. In detail, the drawings show:

FIG. 1 A side view of an embodiment of the electrical machine in accordance with the invention FIG. 2 A detail of the bearing plate of the side view showed in FIG. 1

Figure 3:
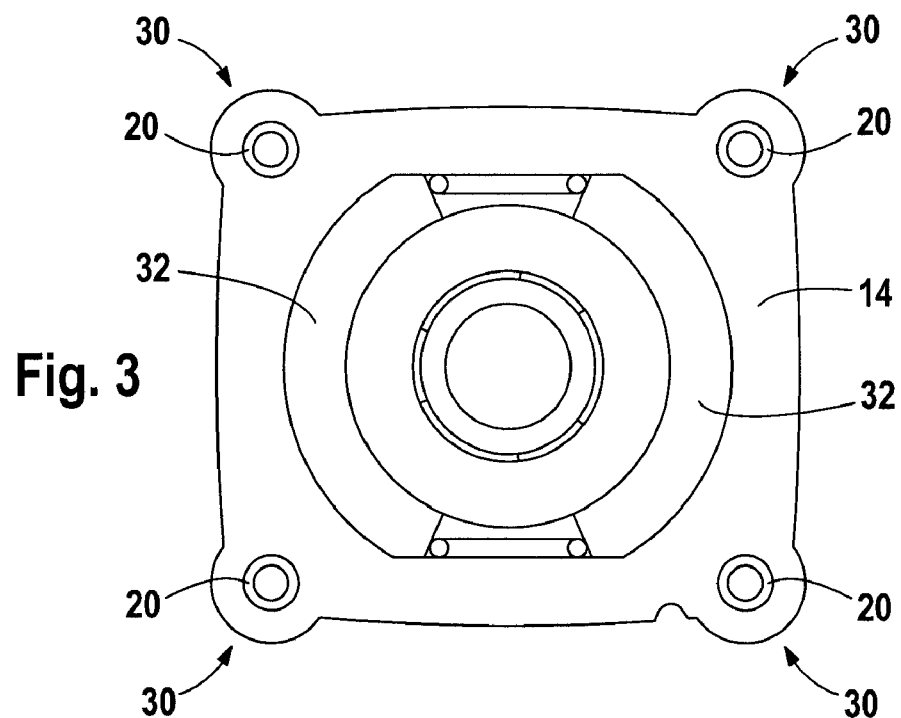
Figure 4:
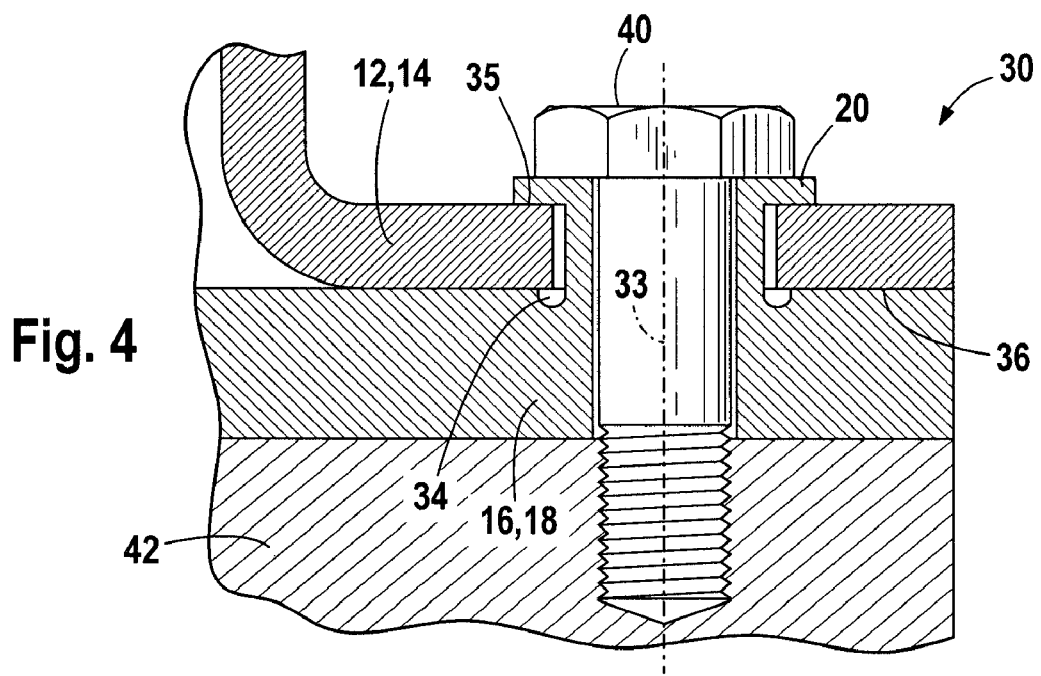
Figure 5:
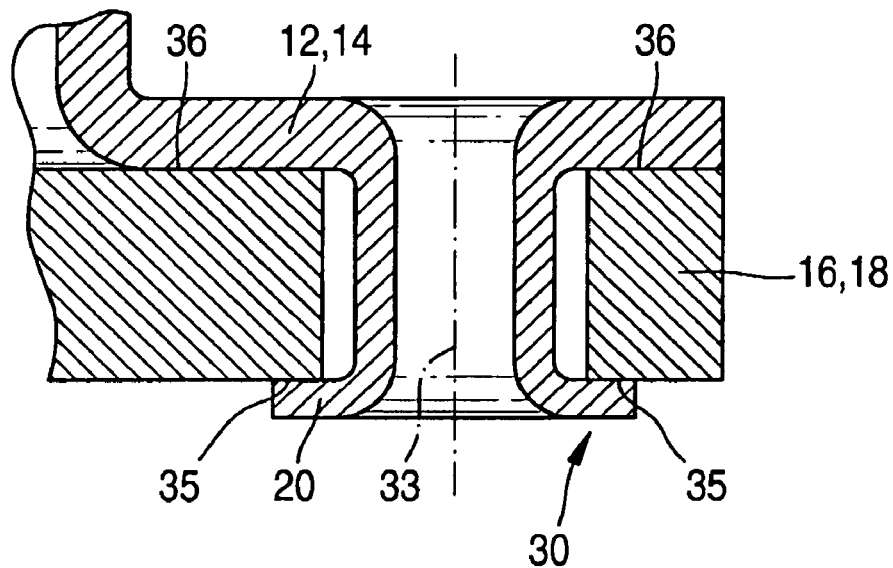

FIG. 3 A view of the electrical machine in accordance with the invention in the connection direction FIGS. 4 through 6 Sectional depictions through embodiments (in the axial direction) through the hollow rivet, flange and pole pot of the electrical machine FIGS. 6.1 and 6.2 Details of the embodiments according to FIG. 6

EMBODIMENTS

FIG. 1 shows a side view of an embodiment of the electrical machine in accordance with the invention and serves to explain the basic structure, particularly the visible components, of the electrical machine. The electrical machine can be a generator, a motor with brushes (so-called DC unit), a brushless motor (so-called EC unit) or an asynchronous machine, a reluctance machine, a synchronous machine or a hysteresis machine, and in particular the electrical machine can be designed to be gearless. The universality with respect to the functionality of a DC unit is depicted without restriction in FIG. 1.

Visible in the external view, the electrical machine 10 has a housing 12 (pole pot) with a housing flange 14 and a bearing plate 16 with a bearing plate flange 18. The housing flange 14 and the bearing plate flange 18 are opposite from one another and arranged with positive engagement so that the cup-like housing 12 and the pot-like bearing plate 16 work together to encapsulate the electrical machine 10. The housing flange 14 and the bearing plate flange 18 have throughbores that are positioned in correlation to one another or the respective flanges 14, 18 have holes going through that are correlated to one another. The holes or throughbores can be cylindrical or polygonal. The connection is fixed by means of hollow rivets 20, whose shaping is adapted to the shape of the throughbores. The hollow rivets 20 will be explained in more detail on the basis of FIG. 2. The bearing plate 16 has a base that forms a connector side 22. One end of the shaft 24 that is rotatably mounted in the electrical machine 10 projects out of the bearing plate 16 on the connector side 22. The housing 12 and/or the bearing plate 18 can have a bearing point for the shaft 24 in their interiors. A working connection of the shaft 24 with an application-related gear stepping (not specified in more detail here) can be produced on the connector side 22 with the mounting of the electrical machine 10 on a connector flange. There is also a plug 26 with a brush carrier on the bearing plate 16 so that a simple and user-friendly connection of the electrical machine 10 to a power source (not shown here) can be effected. The housing 12 accommodates the permanent magnets (not visible) of the DC unit. In the case of an EC unit, the housing 12 accommodates the stator.

FIG. 2 is a detail of the bearing plate 16 of the side view depicted in FIG. 1. This section of the bearing plate 16 with the shaft 24 shows that the bearing plate flange 18 is connected to the housing flange 14 of the housing 12 with a hollow rivet 20 in a borehole going through the flange 14, 18 so that the hollow rivet 20 is essentially oriented parallel to the axis defined by the position of the shaft 24. In an exemplary embodiment, the inside diameter of the hollow rivet 20 can be more than 4.7 mm for example. In general, the inside diameter of the hollow rivet 20 is chosen to be greater than or equal to the diameter of a screw that is used. If, for example, an M4 screw were to be used, the inside diameter of the hollow rivet is ≧4.0 mm. This is also a function of the intended purpose chosen for the electrical machine 10. The hollow rivet 20 can be designed preferably for connecting the housing flange 14 to the bearing plate flange 18 such that the hollow rivet 20 in its center part, i.e., in the section that lies within the throughbores or holes, is essentially free of compression or undeformed, in particular hollow cylindrical or polygonal in accordance with the shaping of the throughbore. This type of rivet joint can be produced in a riveting method or rather with a hollow rivet tool, as disclosed in the prior application Document DE 104 41 752.4 to which explicit reference is made here. The entire disclosure content of this document is herewith incorporated by reference in this description. The housing flange 14 and the bearing plate flange 18 are connected during the fabrication of the unit by means of the hollow rivets 20, by the ends of the hollow rivet forerunners being expanded or rolled over and put over the hole edges so that heads of the hollow rivets 20 are produced. Mounting on a connector can than take place by means of screwed connection: A screw is guided in the screw direction 28 through the remaining opening of the hollow rivet 20 to the connector-side flange (not shown here), wherein the receptacle elements of the connector flange, e.g., in this case screw holes provided with internal threads, are also positioned correlated to the throughbores or holes of the housing flange 14 and of the bearing plate flange 18. In other words, the openings of the hollow rivets 20 form fastening eyes for the application-related connection. In this way, a fastening of the electrical machine 10 on the connector flange is achieved in a simple way that also saves installation space. During the manufacture of the electrical machine proposed in accordance with the invention, the housing 12 (pole pot) is solidly connected to the bearing plate (16, 18) via the hollow rivet 20. During installation at the customer, the unit that is completed in advance is now fastened via fastening elements such as screws through the hollow rivet 20. The clamping force, which is applied by the hollow rivet 20 between the housing flange 14 and the bearing plate flange 18, is increased after customer adaptation by the fastening element that is embodied for example as a screw, because the screw possesses a much higher inherent rigidity than the hollow rivet 20. The load on the hollow rivet 20 is alleviated due to the high forces acting on the screw. It can then be deformed into the plastic range without the clamping connection, which is applied by the fastening element such as a screw for example, being appreciably impacted. The imperviousness and the required rigidity are applied via the fastening element by final assembly depending upon the intended use.

FIG. 3 shows a view of the electrical machine 10 in accordance with the invention in the connector direction. In this embodiment, the housing flange 14 that has an essentially quadratic cross-section has in its corners four fastening eyes 30, which are represented by the hollow rivets 20 lying in the throughbores or holes. In this view, the housing flange 14 is concealing the bearing plate flange 18 that is in alignment behind it and has correlated geometry, in particular correlated bores or holes, which are connected to the housing flange 14 by means of the hollow rivets 20. Shown in the interior of the housing 12 are two individual magnets 32, which are accommodated on the housing 12 and form the permanent magnet of the DC unit. As an alternative to the realization in the individual magnets 32, the permanent magnet can also be embodied as a cylindrical multipole magnet. In general, it must be emphasized that a fastening of the housing 12 to the bearing plate 16 can be accomplished with a plurality of hollow rivets 20.

FIG. 4 shows a variation of an embodiment of a hollow rivet embodied on a bearing plate flange 16, 18.

The depiction in FIG. 4 shows that the hollow rivet 20 can be cast onto the bearing plate flange 18. During final assembly, the hollow rivet 20 is penetrated in the area of the fastening eye 30 by a fastening element 40 that can be embodied as a screw for example, with which the final application is produced on the customer side. In the illustrated embodiment, the fastening element 40 connects the bearing plate flange 18 to a connector flange 42 of a gear stage. The electrical machine 10 is held together in the pre-mounted state by the hollow rivet 20 between the housing 12 (pole pot) on the housing flange 14, which is opposite from the bearing plate flange 18 of the bearing plate 16. The bearing surface, with which the hollow rivet 20 overlaps the housing 12 or the housing flange 14, is identified by reference number 35 and the axis of the hollow rivet by reference number 33. A bearing surface 36 arises between facing sides of the housing 12 or of the housing flange 14 as well as of the bearing plate flange 18 of the bearing plate 16. A relief groove 34 in the material of the bearing plate flange 18 of the bearing plate 16 assures that a sealing contact of the flanges 14 and 18 that face one another is yielded when a fastening element such as a screw for example is inserted into the hollow rivet 20 and tightened.

The depiction in FIG. 5 shows another embodiment of a hollow rivet. According to this embodiment, the housing 12 (pole pot) in the area of the housing flange 14 is drawn in the shape of a hollow rivet. In the area of the fastening eye 30, the hollow rivet 20 passes through the bearing plate flange 18 of the bearing plate 16 and forms a bearing surface 35 with said flange. The bearing surface between the housing 12 (pole pot) and/or from its housing flange 14 on the bearing plate flange 18 of the bearing plate 16 is indicated by reference number 36. Analogous to the depiction in FIG. 4, the axis of the hollow rivet 20 is identified by reference number 33.

The depiction in FIG. 6 shows another embodiment of the hollow rivet. The depiction in FIG. 6 shows that the hollow rivet 20 can be embodied to be bush-shaped and in a mounted state grips over both the housing flange 14 of the housing 12 (pole pot) as well as the bearing plate flange 18 of the bearing plate 16 in the area of said rivet's front side. The bearing surface 36 that arises between the facing sides of the housing flange 14 and of the bearing plate flange 18 during riveting of the hollow rivet 20 is identified by reference number 36.

FIGS. 6.1 and 6.2 depict details of the embodiment according to FIG. 6.

According to FIG. 6.1, the housing flange 14 of the housing 12 (pole pot) has a housing-flange-side recess 37, in which the projection of the hollow rivet 20 engages forming a bearing surface 35 so that a smooth outer side arises with respect to the housing flange 14 of the housing 12 (pole pot). The bearing surface between the housing flange 14 of the housing 12 (pole pot) and the bearing plate flange 18 of the bearing plate 16 is depicted by reference number 36.

FIG. 6.2 depicts another embodiment of a hollow rivet in which the projection of the hollow rivet 20 engages in a bearing-plate-side recess 38. As a result, the projection of the hollow rivet is recessed with respect to the bearing plate flange 18 on the bearing plate 16 so that a smooth outer side arises with respect to the bearing plate flange 18 on the bearing plate 16.

Common to the embodiments of the hollow rivet 20 depicted in FIGS. 4 through 6.2 is that, after preliminary assembly of the housing 12 (pole pot) and the bearing plate 16, said hollow rivet is penetrated by a fastening element embodied as a screw for example, which produces the required rigidity and imperviousness of the connection of the housing 12 to the bearing plate 16.

LIST OF REFERENCE NUMBERS

10 Electrical machine
12 Housing (pole pot)
14 Housing flange
16 Bearing plate
18 Bearing plate flange
20 Hollow rivet
22 Connector side
24 Shaft
26 Plug with brush holder
30 Fastening eye
32 Individual magnets
33 Hollow rivet axis
34 Relief groove
35 Bearing surface, hollow rivet
36 Bearing surface between housing flange and bearing plate flange
37 Recess on the housing flange side
38 Recess on the bearing flange side
40 Fastening element
42 Connector flange of a gear stage

The invention claimed is:

1. Electrical machine (10), comprising a shaft (24), a housing (12) with a housing flange (14) and a bearing plate (16) with a bearing plate flange (18), whereby one end of the shaft (24) projects out of the bearing plate (16), characterized in that the housing flange (14) and the bearing plate flange (18) are connected by means of at least one hollow rivet (20) such that the electrical machine (10) may be mounted by means of a fastening element through the hollow rivet (20) on a connector flange of a gear stage, such that the electrical machine (1) is in a working connection with the projecting end of the shaft (24), the at least one hollow rivet (20) is deformed to connect the housing flange (14) and the bearing plate flange (18), such that the hollow rivet (20) is essentially free of compression in a center part of the hollow rivet (20), said at least one hollow rivet (20) extending through a bore in the housing flange (14) and the bearing plate flange (18), the bore defining sidewalls, the hollow rivet (20) extending through the bore without contacting the sidewalls of said bore in at least one of the housing flange (14) and the bearing plate flange (18).

2. Electrical machine (10) according to claim 1, characterized in that the at least one hollow rivet (20) is oriented essentially parallel to the shaft (24).

3. Electrical machine (10) according to claim 1, characterized in that the housing (12) and/or the bearing plate (16) feature at least one bearing point for the shaft (24) of the electrical machine (10).

4. Electrical machine (10) according to claim 1, characterized in that a stator is mounted on the housing (12).

5. Electrical machine (10) according to claim 1, characterized in that at least one permanent magnet is mounted on the housing (12).

6. Electrical machine (10) according to claim 5, characterized in that the at least one permanent magnet is formed either as a cylindrical multipole magnet or by a number of individual magnets (32).

7. Electrical machine (10) according to claim 1, characterized in that the electrical machine (10) is a gearless motor.

8. Electrical machine (10) according to claim 1, characterized in that the electrical machine (10) is either a motor with brushes or a brushless motor or a generator.

9. Electrical machine (10) according to claim 1, characterized in that the bearing plate (16) features a plug (26) with a brush holder.

10. Electrical machine (10) according to claim 1, characterized in that the housing flange (14) and the bearing plate (18) are connected in the same manner by means of a plurality of hollow rivets (20).

11. Electrical machine (10) according to claim 1, wherein the housing flange (14) substantially abuts the bearing plate flange (18) in response to the at least one hollow rivet (20).

12. Electrical machine (10) according to claim 1, wherein at least one hollow rivet (20) is formed with one of the housing flange (14) and the bearing plate flange (18) to form a single, monolithic component.

13. Method for connecting an electrical machine (10) with a connector flange, whereby the electric machine (10) comprises a housing (12) with a housing flange (14), a bearing plate (16) with a bearing plate flange (18) and a shaft (24) with one end projecting out of the bearing plate (16), and the housing flange (14) and the bearing plate flange (18) are connected by means of at least one hollow rivet (20), characterized in that the electrical machine (10) is connected by means of at least one fastening element through the at least one hollow rivet (20) with a connector flange of a gear stage, such that the electrical machine (1) is in a working connection with the projecting end of the shaft (24), the at least one hollow rivet (20) being deformed in such a way to connect the housing flange (14) and the bearing plate flange (18), the at least one hollow rivet (20) being essentially free of compression in a center part of the hollow rivet (20).

14. Method of claim 13, wherein the at least one hollow rivet (20) extends through a bore in the housing flange (14) and the bearing plate flange (18), the bore defines sidewalls, such that the hollow rivet (20) extends through the bore without contacting the sidewalls of said bore in at least one of the housing flange (14) and the bearing plate flange (18).

15. Method of claim 13, wherein the housing flange (14) substantially abuts the bearing plate flange (18) in response to the at least one hollow rivet (20).

16. Method of claim 13, wherein at least one hollow rivet (20) is formed with one of the housing flange (14) and the bearing plate flange (18) to form a single, monolithic component.

* * * * *